APPARATUS HAVING A TELEVISION CAMERA TUBE AND TELEVISION CAMERA TUBE FOR USE IN SUCH AN APPARATUS

Filed Feb. 10, 1969 2 Sheets-Sheet 1

INVENTORS
JOHANNES H. T. Van ROOSMALEN
JOANNES C. VERMULST
BY
Frank R. Trifari
AGENT

*INVENTORS*
JOHANNES H.T. Van ROOSMALEN
JOANNES C. VERMULST
BY
Frank R. Trifari
AGENT United States Patent Office 3,548,250
Patented Dec. 15, 1970

3,548,250

APPARATUS HAVING A TELEVISION CAMERA TUBE AND TELEVISION CAMERA TUBE FOR USE IN SUCH AN APPARATUS

Johannes Hendrikus Theodorus van Roosmalen and Joannes Cornelis Vermulst, Emmasingel, Eindhoven, Netherlands, assignors to U.S. Philips Corporation, New York, N.Y., a corporation of Delaware Filed Feb. 10, 1969, Ser. No. 798,018
Claims priority, application Netherlands, Feb. 13, 1968, 6802062
Int. Cl. H01j *29/56*
U.S. Cl. 315—31 9 Claims

ABSTRACT OF THE DISCLOSURE

A television camera tube and accompanying circuits for the suppression of the "comettail" effect. A camera tube features a diaphragm having a hole through which the electron beam passes. An electron lens in the shape of a conducting segmental cone is placed between the gun cathode and the lens. During the flyback periods the lens, under the control of pulse generators, focuses the beam through the hole. Therefore, a large beam current reaches the anode, recharging excessively discharged portions thus eliminating "comettails."

When a large intensity light source is focussed onto a television camera picture tube, a large discharge of the anode target takes place. As a result, the electron beam will not be sufficiently intense during the sweep period to recharge the target. This is known as the "comettail effect."

It is therefore an object of the present invention to eliminate the "comettail effect."

This and other objects are achieved by having a diaphragm with a hole located within the electron beam of the tube. An electron lens, typically a segmented cone is placed between the diaphragm and the tube cathode. During the normal sweep operation, a large portion of the lens intercepts the electrons in the beam. During the flyback periods, the cathode potential is raised and the lens focuses the beam so that many more electrons pass through the diaphragm to the target anode. Since the beam current is larger than during the sweep periods it recharges all the points of the target that were highly discharged by the intense light.

The invention relates to an apparatus having a television camera tube which includes a target for producing a potential image of a picture to be taken and an electron gun for producing an electron beam directed to the target, said electron gun comprising a cathode, a control grid and an acceleration anode and said tube comprising a diaphragm for limiting the electron beam arranged between the control grid and the target, which apparatus includes a focussing lens for focussing the electron beam onto the target and deflection means with the aid of which a periodic scanning of the target by the electron beam limited by said diaphragm is obtained for stabilisation at the potential of the target substantially to cathode potential for supplying output signals which corresponds to the potential image, said deflection means comprising a deflection member for line sweeps and line fly-backs and a deflection member for frame sweeps and frame fly-backs.

The said stabilization is attained when the amount of charge supplied per unit time by the electrons to surface elements of the target is equal to that conducted away due to the light from the scene so that the potential of the said surface elements is periodically reduced substantially to cathode potential.

It is common practice in such an apparatus that the electron beam in the electron gun is completely suppressed during the fly-back periods so that electrons can reach the target only during the line sweeps which do not fall within a frame fly-back period. During scanning of the target plate, the electron beam is limited for the major part by a diaphragm so that only a central part of the electron beam can reach the target. This is necessary in order to obtain at the target a beam of sufficient current density and of small diameter so that a satisfactory resolving power is ensured.

In a known apparatus of the kind mentioned in the first paragraph, the television camera tube is a "Plumbicon." The target is constituted in this case by a photoconducting layer which at least mainly consists of lead monoxide applied to a transparent signal plate. The signal plate is connected through a signal resistor to the terminal of a voltage source This terminal has a positive potential relative to the cathode. The free surface of the target faces the electron gun. The scene is projected through the signal plate onto the target and produces in elementary regions of the target a photocurrent the value of which depends upon the intensity of the incident light, as a result of which the potential of the free surface of the elementary regions increases in accordance with the intensity of the incident light. Due to the scanning by the electron beam, this potential is stabilized to cathode potential, the resulting potential fluctuations appearing across the signal resistor as output signals. The characteristic curve of the photocurrent as a function of the incident light flux is substantially linear. This affords the advantage that with a normal exposure, output signals are obtained which linearly depend upon the illumination intensity.

The linearity of the said characteristic curve also involves disadvantages, however. An excessive light intensity gives rise to unstabilized regions on the target of the television camera tube because the electron beam cannot supply a sufficient quantity of electrons for stabilization of said regions. A moving light of high intensity, such as a glowlight, a flashlight and the like, gives rise to particularly disturbing effects, such as comettail effects.

These disadvantages may also be found in other apparatus of the kind mentioned in the first paragraph, for example, in an apparatus in which the scene is projected onto a target composed of a plurality of silicon diodes which are discharged in accordance with the incident light flux, and, for example, in an apparatus in which the light of the scene produces a photoelectron current which falls on the target and causes it to assume a conductivity induced by electron bombardment.

The invention has for an object to provide an apparatus in which the said disadvantages are mitigated.

According to the invention, an apparatus having a television camera tube which includes a target for producing a potential image corresponding to a scene and an electron gun for producing an electron beam directed to the target, said electron gun comprising a cathode, a control grid and an acceleration anode and said tube comprising a diaphragm for limiting the electron beam arranged between the control grid and the target, which apparatus includes a focusing lens for focusing the electron beam onto the target and deflection means with the aid of which a periodic scanning of the target by the electron beam limited by said diaphragm is obtained for stabilization of the potential of the target substantially to cathode potential for supplying output signals which correspond to the potential image, said deflection means comprising a deflection member for line sweeps and line fly-backs and a deflection member for frame sweeps and frame-backs, includes a lens element connected to a first pulse generator for achieving during fly-backs a beam cross-over substantially at said diaphragm and includes a second pulse generator for simultaneously achieving an increased cathode potential relative to the potential of the target.

It should be noted that the term "lens element" is to be interpreted in the broad sense, so that any element contributing to a magnetic or electrostatic lens field, for instance any electrode of the electron gun, is covered by this term.

It should also be noted that the term "pulse generator" is to be understood to mean herein not only a known generator for producing pulses but also an element deriving in known manner a pulse from a pulse available, for example, from a deflection fly-back pulse.

In the apparatus according to the invention, during fly-back periods, electrons are emitted from the cathode having an increased potential relative to the potential of the target. These electrons are concentrated to a corss-over substantially at the diaphragm. Thus, during fly-back periods a large number of electrons is supplied for auxiliary stabilization of regions on the target plate which are struck by light of excessive intensity and cannot be stabilized during line sweep periods owing to the comparatively small number of electrons then available. The auxiliary stabilization is a stabilization to increased cathode potential so that it only influences regions struck by light of excessive intensity, that is to say that the potential image in regions not struck by light of excessive intensity is not erased during the fly-back periods but supplies during the line sweep periods correct output signals corresponding to the potential image. In this apparatus, a better impact of the electrons of the electron beam on the target and hence a higher speed of response can be obtained than in the known apparatus as it is not necessary to use an excess beam current during the sweep periods for erasing the information resulting from a given excessive light intensity. Furthermore, the disturbing influence of the potential of the free surface of the periphery of the target not scanned during the sweep periods on the electrons directed to regions in the proximity of said periphery can be reduced by scanning said periphery during fly-back periods.

It should be noted that an apparatus is known in which a cross-over is temporarily formed in an electron beam for scanning a screen in the proximity of a beam-limiting diaphragm in order to obtained a high current intensity and a wide scanning spot at the screen by decreasing the potential of a lens element arranged between the electron gun producing the beam and the limiting diaphragm. However, this apparatus has a storage tube in which signals written on the screen are read by the electron beam in the operation "reading" without stabilization of the screen, whereby a residue of information is left which is completely erased by an additional scanning in the operation "erasing" before new information is written, whereby the potential of the said lens element, which is the central electrode of a focusing system composed of three cylindrical electrodes, has been reduced, for example, by 700 v. with the aid of a switch.

In the apparatus according to the invention, a third pulse generator may be connected to the control grid to supply pulses for adapting the control-grid potential to the increased cathode potential. Thus during the auxiliary stabilization a most suitable work point of the gun and an optimum current passage through the diaphragm can be attained.

The said pulse generators may be designed to supply pulses during frame fly-back periods. In this case, no stringent requirements are imposed on the steepness of the pulse flanks.

The said pulse generators may alternatively be adapted to supply pulses during line fly-backs periods. In this case, the requirements imposed on the steepness of the pulse flanks are more stringent, but the advantage is then obtained that current of approximately equal density can be supplied to all points of the target.

The said pulse generators may also be adapted to supply pulses both during line fly-back periods and during frame fly-back periods. In this case, a very large number of electrons is available for auxiliary stabilization.

The apparatus preferably includes a fourth pulse generator which is connected to the focusing lens and supplies pulses for varying the strength of the focusing lens during the fly-back periods so that a favourable current-density distribution can be attained during the auxiliary stabilization and, for example, an optimum diameter of the beam directed to the periphery of the target can be obtained, which results in a reduction of beam-bending effects at the periphery during the sweep period.

The invention also relates to a television camera tube for use in an apparatus of the kind set forth, more particularly but not exclusively such as a television camera tube of the type "Plumbicon," in which the target is constituted by a photoconducting layer applied to a transparent signal plate and consisting at least mainly of lead monoxide.

The television camera tube preferably accommodates a lens electrode acting as the said lens element in the apparatus described. In the apparatus, the lens element connected to the first pulse generator may also be an electromagnetic lens element, but an electrostatic lens electrode is to be preferred because a magnetic lens element is comparatively heavy and requires a comparatively large amount of energy during operation.

The said lens electrode may be a tubular lens electrode arranged between the control grid and the diaphragm inside a cylindrical electrode. This construction can be readily obtained by incorporating an additional tubular lens electrode in a tube otherwise constructed in usual manner. A large accuracy is then not required. In operation, only comparatively small pulses are to be supplied to the lens electrode if the direct-voltage potential of the tubular lens electrode already differs considerably from the direct-voltage potential of the cylindrical electrode.

The tubular lens electrode is preferably a conical electrode widening towards the diaphragm so that beam electrons are prevented from striking the tubular lens electrode.

The tubular lens electrode further preferably comprises relatively electrically separated sectors extending in the axial direction. Variable voltages may be applied to said sectors so that the tubular lens electrode may act at the same time as a centering device.

In order to avoid difficulties in mounting, the lens electrode is preferably constituted by a conductive coating of the wall of a bore in an insulating support arranged with tight fit in the cylindrical electrode. It is particularly advantageous to construct such a lens electrode in the form of relatively separated sectors.

The invention will be described with reference to the accompanying drawing, in which.

Figure 1:
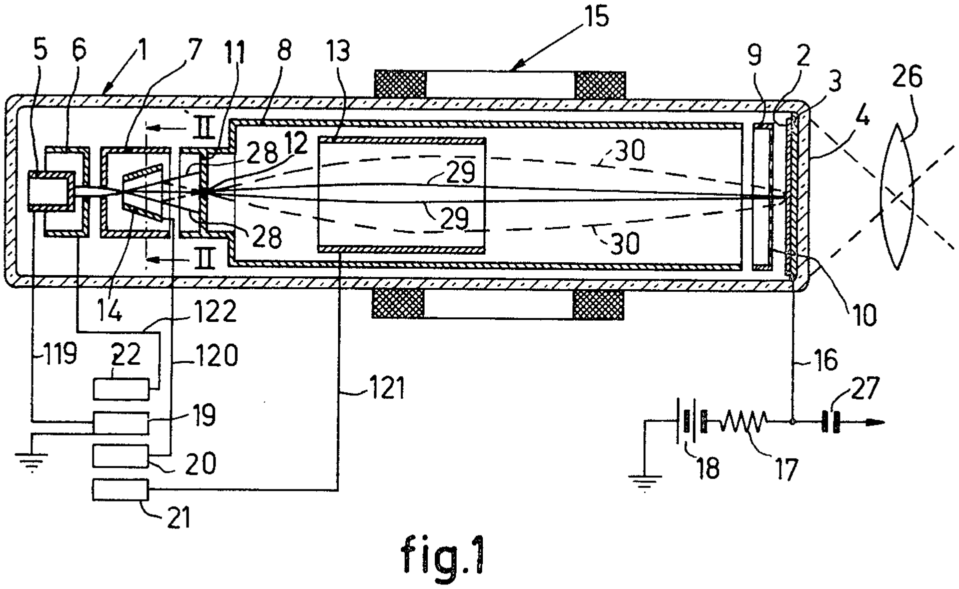
FIG. 1 shows an embodiment of the apparatus according to the invention, in which the television camera tube is a "Plumbicon" shown in longitudinal sectional view.

The camera tube shown in FIG. 1 has an exhausted cylindrical glass envelope 1. The tube includes a target 2 which is constituted by a layer which mainly consists of lead monoxide and is applied by vapour deposition to a signal plate 3 which consists of an extremely thin layer of good conducting tin oxide applied to the inner side of the window 4 constituted by one end of the envelope. At its other end the envelope 1 accommodates the rotation-symmetrical electron gun which is coaxial to said envelope and comprises a cathode 5, a control grid 6 and a cylindrical acceleration anode 7. A second cylindrical anode 8 and an electrically conducting gauze 10 provided on a cylindrical electrode 9 are interposed between the acceleration anode 7 and the target 2. The second cylindrical anode 8 accommodates a diaphragm 11 which is electrically connected to the cylindrical anode 8 and is provided with an opening 12 having a diameter of 250$\mu$. The second cylindrical anode further accommodates a focussing electrode 13 which together with the second cylindrical anode 8 constitutes a focussing lens. The cylindrical anode 7 accommodates a tubular lens electrode 14 which is conical and widens towards the diaphragm 11. The securing means and the various lead-in conductors of the electrodes are not shown in the figure.

The tube is partly surrounded by line deflection coils and frame deflection coils denoted by the common reference numeral 15. The signal plate 3 is connected through a lead-in conductor 16 passed through the envelope and through a signal resistor 17 to one terminal of a voltage source 18, the other terminal of which is earthed. Pulse generators 19, 20, 21 and 22 with supply conductors 119, 120, 121 and 122 are shown diagrammatically.

In operation, the electrodes have the following direct-voltage potentials:

| | Volts |
|---|---|
| Cathode **5** | 0 |
| Control grid **6** | between −100 and 0 |
| First anode **7** | 300 |
| Second anode **8** | 300 |
| Electrodes **9** and **10** | 600 |
| Signal electrode **3** | 45 |
| Focussing electrode **13** | 100 |
| Electrode **14** (on an average) | 100 |

The scene is focussed by means of an optical system indicated diagrammatically by a lens 26 through the window 4 and the signal plate 3 on the target 2 of the tube. During sweep periods, the free surface of the target 2 is scanned by the electron beam produced by the electron gun along a rectangular frame. The surface is then stabilized substantially to cathode potential and electric signals are produced which are derived through a capacitor 27 from the signal resistor 17. The electron current between the cathode 5 and the diaphragm 11, the variation of which is indicated by full lines 28, is collected for the major part by the diaphragm 11. Only the central part of the beam, which is indicated by full lines 29 is used for this scanning.

During fly-back periods, the pulse generator 19 supplies, for example, a positive pulse of 5 v. to the cathode 5. At the same time, the pulse generator 20 supplies, for example, a negative pulse of 80 v. to the electrode 14. Thus, a cross-over of the beam indicated by broken lines 30 is achieved at opening 12 in the diaphragm 11 and a large current is available for stabilization to 5 v. The pulse generator 21 is adapted to supply pulses for readjusting the focussing lens. The pulse generator 22 is adapted to supply pulses for obtaining an optimum work-point adjustment of the electron gun.

It will be appreciated that the pulse generators 19, 20, 21 and 22 may be adapted in a known manner for purposes explicitly mentioned in this description and for other special purposes.

Figure 2:
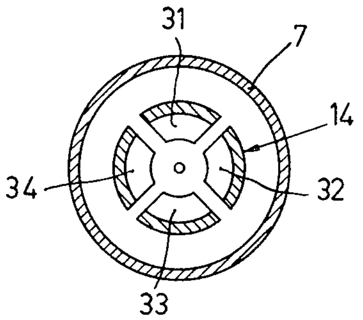
FIG. 2 is a sectional view taken on the line II—II of FIG. 1.

The lens element 14 comprises four relatively electrically separated sectors 31, 32, 33 and 34 extending in the axial direction, as shown in sectional view in FIG. 2. The sectors 31 and 33 are connected to the terminals of a source of variable direct voltage (not shown). The sectors 32 and 34 are also connected to the terminals of a source of variable direct voltage (not shown). The electron beam can be centered by adjustment of the variable voltages of said voltage sources.

Figure 3:
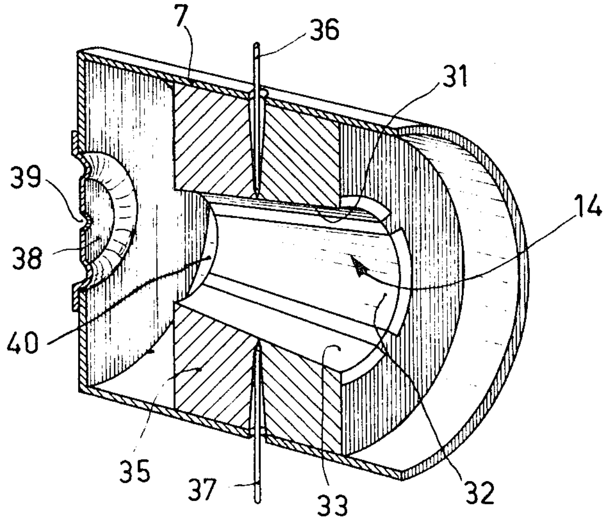
FIG. 3 is a sectional view of a lens construction of a television camera tube according to the invention.

In the lens construction of a television camera tube according to the invention shown in detail in FIG. 3, each element correspondnig to an element of FIG. 1 or FIG. 2 is provided with the same reference numeral as this element. FIG. 3 shows an acceleration anode 7 provided with a conducting foil 38 which has an opening 39 and with a lens element 14 constituted by an electrically conducting coating comprising four sectors and consisting, for example, of molybdenum and manganese, applied on the wall of a central conical bore 40 of a ceramic support 35 arranged in the acceleration anode 7 with tight fit. The four sectors of the conductive coating, of which only the sectors 31, 32 and 33 are visible in FIG. 3, each have an electric supply conductor passed through an opening in the acceleration anode 7 and through the support 35. The supply conductor 36 of the sector 31 and the supply conductor 37 of the sector 33 are shown in the figure. The construction of FIG. 3 permits of obtaining a very accurate but also a very simple mounting.

The apparatus comprises a lens element and pulse generators for achieving during fly-back periods a beam cross-over at a beam-limiting diaphragm and simultaneously an increased cathode potential so that during fly-back periods a large number of electrons are available for auxiliary stabilization of regions on the target of the television camera tube struck by light of excessive intensity.

What is claimed s:

1. An apparatus having a television camera tube which includes a target for producing a potential image corresponding to a scene and an electron gun for producing an electron beam directed to the target, said electron gun comprising a cathode, a control grid and an acceleration anode, and said tube comprising a diaphragm having a hole for limiting the electron beam arranged between the control grid and the target, a focusing lens for focussing the electron beam onto the target and deflection means with the aid of which a periodic scanning of the target by the electron beam limited by said diaphragm is obtained for stabilization of the potential of the target substantially to cathode potential for supplying output signals which correspond to the potential image, said deflection means comprising a deflection member for line sweeps and line fly-backs and a deflection member for frame sweeps and frame fly-backs, the improvement comprising a lens element, a first pulse generator coupled to said lens element for achieving during fly-backs a beam cross-over substantially at said diaphragm hole and a second pulse generator for simultaneously achieving an increased cathode potential relative to the potential of the target.

2. An apparatus as claimed in claim 1, further comprising a third pulse generator which is connected to the control grid for adapting the control-grid potential to the increased cathode potential.

3. An apparatus as claimed in claim 1, wherein the said pulse generators supply pulses during frame fly-back periods.

4. An apparatus as claimed in claim 1, wherein the said pulse generators supply pulses during line fly-back periods.

5. An apparatus as claimed in claim 1, further comprising a fourth pulse generator which is connected to the focussing lens and supplies pulses for varying the strength of the focussing lens during the fly-back periods.

6. A television camera tube comprising an enclosure, an electron gun having a cathode for emitting electrons located at one end of said enclosure, a target located at another end of said enclosure to receive said electrons emitted from said cathode, a diaphragm for intercepting said electrons having a hole located between said target and said cathode, a cylindrical electrode located between said cathode and said diaphragm, and a tubular electron lens element arranged inside said cylindrical electrode and located between said cathode and said diaphragm for controlling the focus of said electrons thereby controlling the proportion of electrons from said cathode intercepted by said diaphragm.

7. A tube as claimed in claim 6, wherein the tubular lens electrode is a conical electrode widening towards the diaphragm.

8. A tube as claimed in claim 6, wherein the tubular lens electrode comprises axially extending relatively electrically separated sectors.

9. A tube as claimed in claim 6, wherein the lens electrode comprises an insulating support having a bore arranged with a tight fit in the cylindrical electrode and a conductive coating on the bore.

References Cited

UNITED STATES PATENTS

| | | | |
|---|---|---|---|
| 2,880,342 | 3/1959 | Frenkel | 313—85X |
| 3,441,786 | 4/1969 | Clayton | 313—85X |
| 3,331,985 | 7/1967 | Hamann | 313—85X |

RODNEY D. BENNETT, Primary Examiner

J. G. BAXTER, Assistant Examiner

U.S. Cl. X.R.

313—85; 315—11